United States Patent [19]

Teraoka et al.

[11] Patent Number: 5,462,035
[45] Date of Patent: Oct. 31, 1995

[54] SUPERCHARGING DEVICE

[75] Inventors: Masao Teraoka; Tomiaki Ochiai; Mitsuru Hasegawa, all of Tochigi, Japan

[73] Assignee: Tochigi Fugi Sangyo Kabushiki Kaisha, Japan

[21] Appl. No.: 65,245

[22] Filed: May 20, 1993

[30] Foreign Application Priority Data

May 21, 1992 [JP] Japan .................. 4-033586 U
May 21, 1992 [JP] Japan .................. 4-033606 U

[51] Int. Cl.$^6$ .................... F02B 39/04; F16H 59/00
[52] U.S. Cl. ............... 123/561; 474/18; 474/28
[58] Field of Search ............... 123/561; 474/18, 474/28

[56] References Cited

U.S. PATENT DOCUMENTS

| | | | |
|---|---|---|---|
| 3,052,132 | 9/1962 | Dittrich et al. | 474/18 |
| 4,229,988 | 10/1980 | Rattunde | 474/28 |
| 4,884,997 | 12/1989 | Hattori | 474/18 |
| 5,256,109 | 10/1993 | Winkelmann et al. | 474/18 |

FOREIGN PATENT DOCUMENTS

| | | | |
|---|---|---|---|
| 2566082 | 12/1985 | France . | |
| 3801227 | 11/1988 | Germany | 123/561 |
| 3933409 | 4/1991 | Germany | 123/561 |
| 1-69400 | 5/1989 | Japan . | |
| 1-113518 | 5/1989 | Japan | 123/561 |
| 3-500564 | 2/1991 | Japan . | |

*Primary Examiner*—Michael Koczo
*Attorney, Agent, or Firm*—Graham & James

[57] ABSTRACT

A supercharging device including an actuator for controlling return force of a resilient member in a continuously variable transmission (CVT) with a flyweight and a resilient member is provided. The actuator is employed so that a movable flange slides along the axis thereof away from a fixed flange in a drive pulley of the CVT when under a light load for which auxiliary machinery such as a supercharger driven by the CVT requires little driving force. The actuator is installed inside an input pulley through which the driving force of the engine is transmitted to the drive pulley.

4 Claims, 5 Drawing Sheets

SUPERCHARGING DEVICE

BACKGROUND OF THE INVENTION

The present invention relates to an auxiliary machinery controlling device and a supercharging device for, for example, supercharging an internal combustion engine to increase the output level thereof, and more particularly, to a supercharging device comprising auxiliary machinery, for example, a mechanical type supercharger, of which the rotational frequency is regulated by a belt-type continuously variable transmission which uses the centrifugal force of a flyweight provided therein.

A conventional mechanical-type supercharger whose rotational frequency is controlled by a belt-type continuously variable transmission (often abbreviated to CVT) which uses the centrifugal force of a flyweight provided therein has been disclosed in International Publication No. WO89/02521 (i.e., the official announcement Hei 3-500564 (1991) in Japan). In this supercharger, a runner shaft with a runner is rotatably supported inside a housing. In order to supercharge the internal combustion engine, the runner shaft is driven by a secondary pulley device (a driven pulley device) of the continuously variable transmission, which is driven by the internal combustion engine through an electromagnetic clutch and a speed increasing gear device.

Although the above-identified application does not disclose a primary pulley (a drive pulley) of a continuously variable transmission, a primary pulley as well as a secondary pulley in a continuously variable transmission is disclosed in Japanese Utility Model Application Laid Open (Prepublication) No. 1-69400 (1989). In this transmission, the drive pulley and the driven pulley each comprise a mutually opposed fixed flange (disk) and a movable flange. The fixed flanges of the drive pulley and the driven pulley are arranged on relative opposite sides. The movable flanges serve to vary the widths of V-shaped grooves of the drive pulley and the driven pulley. A flyweight for generating a centrifugal force is provided in at least one of the drive pulley and the driven pulley. Also, a spring for exerting a return force against the centrifugal force is provided in at least one of the drive pulley and the driven pulley.

In the above-described supercharger and CVT, even when the engine speed varies, if the engine speed is within a predetermined range, the rotational frequency of the supercharger can be controlled by the continuously-variable transmission so as to be maintained substantially constant. Moreover, only under a heavy load condition which requires the supercharger to be operated, the supercharger is operated while receiving power transmitted through an electromagnetic clutch to improve engine performance (i.e., driving ability). Namely, once the engine speed reaches a certain level, for example, a point "c" in FIG. 1, the conventional mechanical type supercharger with a centrifugal weight-type CVT is controlled so that the rotational frequency of the supercharger is maintained at a predetermined constant level, regardless of the load on the internal combustion engine. Specifically, when the rotational frequencies of the drive and driven pulleys increase beyond the point "c", the pitch radius of the driven pulley becomes large in response to the centrifugal force of the flyweight followed by a decrease of the pitch radius of the drive pulley, thereby resulting in a speed reducing mode. While reaching the speed reducing mode, however, the continuously variable transmission tries to achieve a speed increasing mode to counteract the above-described condition. In this manner, even though the rotational frequency of the drive pulley varies, the rotational frequency of the driven pulley is maintained substantially constant while proceeding along a line segment "d" in FIG. 1.

As a result, even under the partial load conditions or relatively light load conditions which require no supercharging, the rotational frequency of the supercharger reaches the predetermined constant level, that is, a high rotational frequency level, thereby causing inefficient fuel consumption.

Further, although the electromagnetic clutch is employed to cut off the power transmitted to the supercharger under partial load conditions, driving ability is unfavorably affected by the on/off operation of the electromagnetic clutch in response to the variation in the load, thereby causing poor driving conditions. Consequently, the cutoff range has to be narrow, thereby resulting in poor fuel consumption.

In order to resolve the above-mentioned problems, the employment of an actuator may be considered for controlling the return force of the spring. However, if the actuator is simply arranged, It may be difficult to arrange a standard type of supercharger with CVT which does not include an actuator.

SUMMARY OF THE INVENTION

In view of the above, an object of the present invention Is to solve the aforementioned problems in the prior art through the introduction of an auxiliary machinery controlling device or a supercharging device having reduced influence upon driving ability while improving fuel efficiency and occupying as small a space as possible.

Another object of the present invention is to provide a supercharging device in which interchange from a standard type of supercharger which does not include an actuator to an optional type of supercharger with an actuator, or vice versa, is easy.

The afore-mentioned objects of the present invention are accomplished through an auxiliary machinery controlling device or a supercharging device comprising: a continuously variable transmission being driven by an internal combustion engine, the transmission including a drive pulley, a driven pulley, a belt, a flyweight, and a resilient member, the drive and driven pulleys having movable flanges and fixed flanges, the drive pulley rotatably supported upon a fixed shaft, the belt being wound around and coupling the drive and driven pulleys, and the flyweight and the resilient member being provided on at east one of the drive pulley and the driven pulley; auxiliary machinery or a mechanical-type supercharger driven by the continuously variable transmission; and control device including an actuator for controlling return force of the resilient member in the continuously variable transmission so that the movable flange slides along the axis thereof away from the fixed flange in the drive pulley when under a light load for which the auxiliary machinery requires little driving force, the actuator being installed inside an input pulley through which the driving force of the engine is transmitted to the drive pulley.

In the above-mentioned auxiliary machinery controlling device or supercharging device, under a partial load condition or a light load condition during normal operation, the movable flange of the drive pulley which may be pressed by the presser member is caused to slide by the control means against the return force of the resilient member to increase the width of a V-shaped groove defined between the fixed flange and the movable flange. Accordingly, the auxiliary machinery such as the supercharger is driven by the continuously variable transmission in a speed-reducing mode or a low rotational frequency mode which has an intermediate rotational frequency, thereby resulting in efficient fuel consumption. Transition from the low rotational frequency mode to a high rotational frequency mode and vice versa in the CVT can be said to include transition from the intermediate rotational frequency to the maximum rotational frequency and vice versa. Thus, it is possible to avoid any shocks that might occur when the power transmitted to the supercharger is cut off, thereby improving the driving conditions.

Moreover, since the actuator for controlling the return force of the resilient member is installed inside the input pulley, no surplus spaces are required to accomplish the above-described operation. Further, in the supercharging device according to the present invention, installing and removing the actuator inside and from the input pulley is easy, thereby facilitating the interchange from a standard type of supercharger which does not include an actuator to an optional type of supercharger with an actuator, or vice versa. The rotational frequency of the standard type of supercharger is maintained substantially constant since there is no device for controlling the return force of the resilient member.

DETAILED DESCRIPTION OF THE PREFERRED EMBODIMENTS

Figure 1:
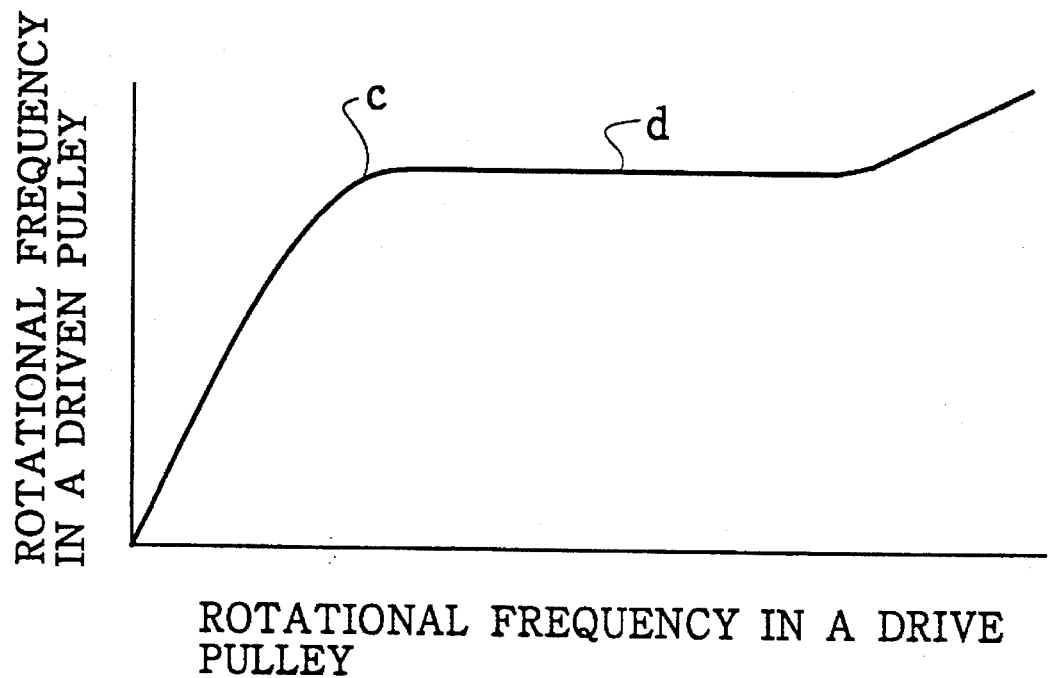
FIG. 1 is a line graph showing a relationship between rotational frequencies in a drive pulley and rotational frequencies in a driven pulley in a supercharging device which does not have an actuator.

Auxiliary machinery controlling devices or supercharging devices according to the present invention will be described hereinafter with reference to FIGS. 1–6. The below-described right and left sides or directions and the downward direction correspond, respectively, to the right and left sides or directions and the downward direction in FIGS. 2, 4, 5, and 6. Further, the same reference numerals are used throughout FIGS. 1–6 to designate the same or similar element.

FIRST EMBODIMENT

Figure 2:
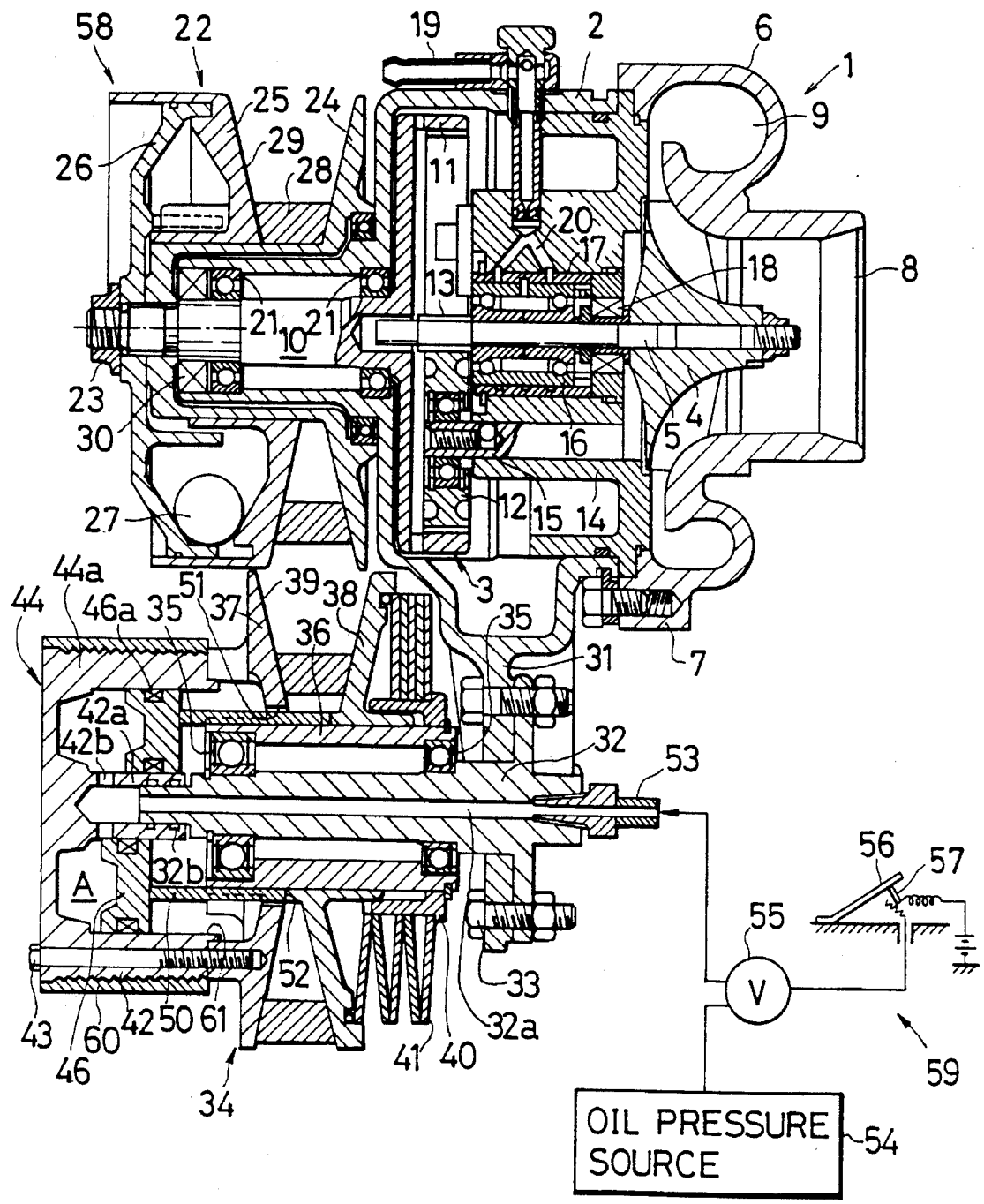
FIG. 2 is a sectional view of a supercharging device for an internal combustion engine according to a first embodiment of the present invention.
Figure 3:
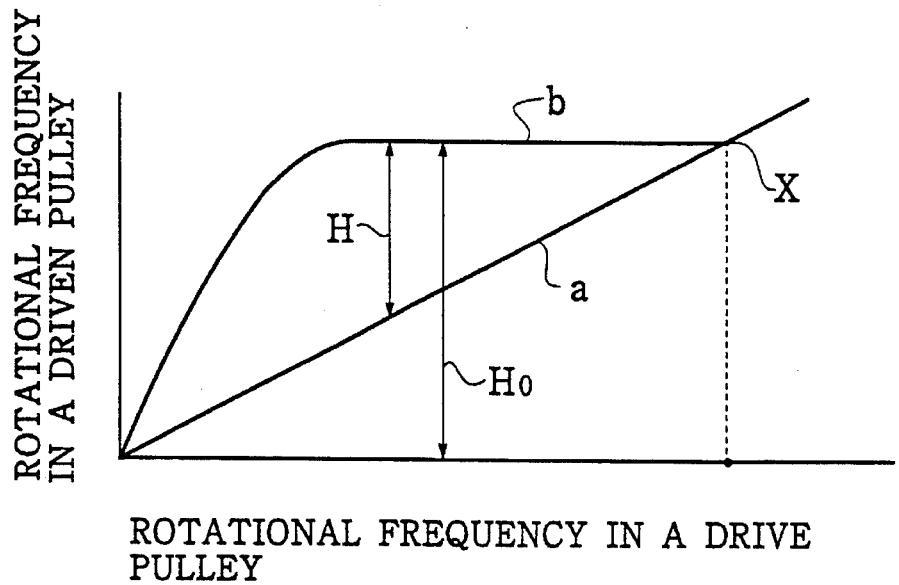
FIG. 3 is a line graph showing a relationship between rotational frequencies in a drive pulley and rotational frequencies in a driven pulley illustrated in FIG. 2.
Figure 4:
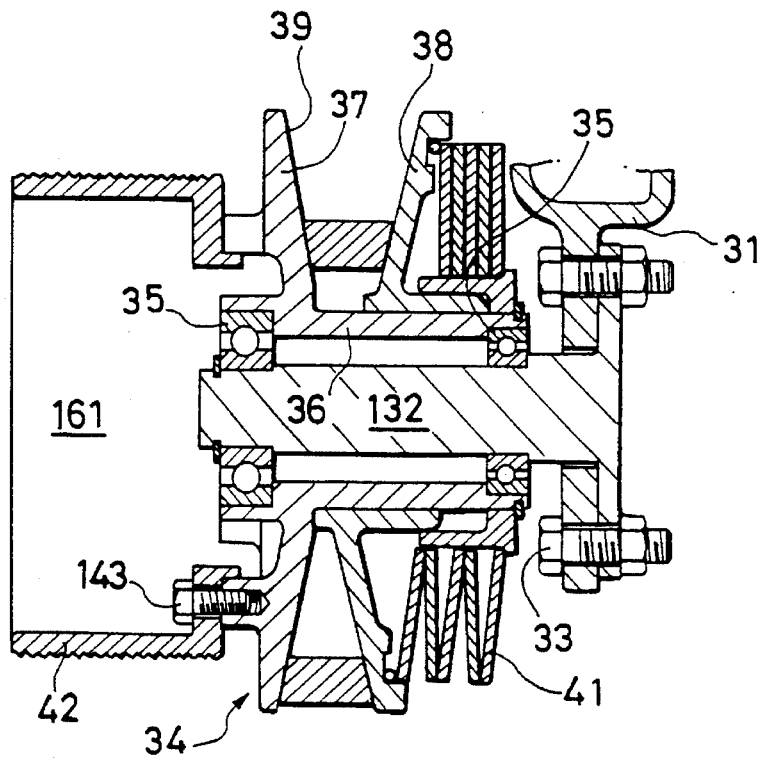
FIG. 4 is a sectional view of a part of a supercharging device which does not have an actuator.

Referring to FIGS. 2–4, a first embodiment according to the present invention will be described hereinafter.

First, as shown in FIG. 2, a structure of a supercharging device will be described. A mechanical supercharger 1 has a housing 2 mounted on an assembly such as an internal combustion engine which is not shown. A speed increasing gear device 3 and a runner shaft 5 with a runner 4 are accommodated in the housing 2. The housing 2 is integrally coupled with a shroud 6 by a bolt 7. The shroud 6 has a horizontally extending cylinder such as an air inlet 8 and an air outlet 9 having a spiral shape.

The acceleration gear device 3 comprises an internal gear 11 integrally formed with an input shaft 10, a pair of pinions 12, and a sun gear 13. Each of the pinions 12 is rotatably supported on a shaft 15. The shaft 15 is supported by a boss 14 which is secured between the housing 2 and the shroud 6. Although only one is shown in the figure, both of the pinions 12 are engaged with the sun gear 13 and the internal gear 11. The sun gear 13 is integrally formed with the runner shaft 5 and is rotatably supported on the boss 14 through a double row angular contact ball bearing 16 and a spacer 17. The runner shaft 5 is provided with a mechanical seal 18 on the rear side of the runner 4. The ball bearing 16 is supplied with lubricating oil through a branch shaped path 20 from a lubricant supply pipe 19 formed at the top of the housing 2.

The input shaft 10 is rotatably supported in the housing 2 through two ball bearings 21 on the left side of the housing 2.

The input shaft 10 is integrally coupled with a driven pulley 22 by a nut 23 on its left side. The driven pulley 22 has a fixed flange 24 on its right side and a movable flange 25 on its right side. The fixed flange 24 is secured to the input shaft 10. The movable flange 25 is movable in the axial direction of the input shaft 10 with respect to the fixed flange 24. A V-shaped groove 29 into which a belt 28 is received is formed between the fixed flange 24 and the movable flange 25. A flyweight 27 for generating a centrifugal force is held between the rear surface of the movable flange 25 and a conical plate 26 which is secured to the input shaft 10. In FIG. 2, the reference numeral 30 represents an oil seal. The upper and lower halves of the driven pulley 22 in FIG. 2 are illustrated in a widened state in which the V-shaped groove 29 is widened and in a narrowed state in which the V-shaped groove 29 is narrowed, respectively.

The housing 2 has a flange 31 extending downwards. A fixed shaft 32 which extends from the flange 31 to the left is secured to the flange 31 through bolts 33. A drive pulley 34 is rotatably supported on the fixed shaft 32 through ball bearings 35. The drive pulley 34 has a fixed flange 37 and a movable flange 38 on its left and right sides, respectively. A V-shaped groove 39 into which the belt 28 is received is formed between the fixed flange 37 and the movable flange 38. Thus, the belt 28 is wound around and couples the drive pulley 34 and the driven pulley 22.

The fixed flange 37 is secured at a specific position upon the fixed shaft 32. Further, the fixed flange 37 is integrally formed with a cylindrical portion 36 which holds outer races of the ball bearings 35 so that the fixed flange 37 is rotatable at the specific position.

An end plate 40 is positioned between the rear surface of the movable flange 38 and the cylindrical portion 36. A disk spring 41 comprising five plates is provided adjacent to the movable flange 38, so that the movable flange 38 can be pressed by the disk spring 41, and is movable along the axis of the fixed shaft 32. The left side of the fixed flange 37 is secured by a bolt 43 to an input pulley 42 which has a flat belt 60 and is driven by a crankshaft of the internal combustion engine. Thus, a continuously variable transmission 58 is made up of the drive pulley 34 with the disk spring 41; the driven pulley 22 with the flyweight 27; and the V-belt 28. In FIG. 2, the V-shaped groove 39 is shown In a widened state and in a narrowed state above and below the fixed shaft 32, respectively. The V-shaped groove 39 is pressed by the disk spring 41 into the narrowed state.

A room 61 formed inside the input pulley 42 serves as an actuator 44. That is, an oil pressure type of cylinder 44a which is a part of the actuator 44 is arranged inside the input pulley 42 along the inside circumference thereof so as to have the same axis as that of the input pulley 42. A piston 46 is provided inside the cylinder 44a so as to be slidable back and forth. The cylinder 44a and the piston 46 rotate together with the input pulley 42. The piston 46 has seals 46a abutting the cylinder 44a and a center boss 42a which is secured to the fixed shaft 32. The center boss 42a has seals 32b abutting the fixed shaft 32. The right side of the piston 46 abuts a cylindrical member 50. The cylindrical member 50 extends from the piston 46 to the right while penetrating an aperture 51 of a circular boss of the fixed flange 37. The right side of the cylindrical member 50 abuts an abutting face 52 of the movable flange 38. A left chamber A which is formed on the left side of the piston 46 inside the cylinder 44a of the actuator 44 has an inlet 53 which is provided on the right side of the fixed shaft 32. A hole 32a is provided in the fixed shaft 32 along the axis thereof. Further, the center boss 42a has holes 42b in the radius direction thereof. A pressurized oil from an oil pressure source 54 is supplied through a valve 55 to the left chamber A through the inlet 53, the hole 32a, and the holes 42b. The valve 55 is connected to a regulator 57 which controls the degree of opening of the valve 55 based on the setting of an accelerator pedal 56. Specifically, the regulator 57 controls the valve 55 so that the degree of opening of the valve 55 is large when the set angle of the accelerator pedal 56 is small, namely when under a light load for which the supercharger requires little supercharging. Further, the amount of the pressurized oil supplied to the airtight cylinder 44a becomes small in response to an increase in the load on the internal combustion engine. Thus, a maximum amount of the pressurized oil is supplied under a light load and no pressurized oil is supplied under a heavy load for which the supercharger requires supercharging.

As described above, the actuator 44, the oil pressure source 54, the valve 55, and the regulator 57 serve to change the rotational frequency of the supercharger 1 while controlling the return force of the disk spring 41 provided in the drive pulley device 34 under light or heavy load conditions. Thus, the combination of these components forms a control device 59 for controlling the continuously variable transmission 58.

Next, operation of an optional type of supercharging device for the first embodiment will be explained with reference to FIG. 3 as well as FIG. 2.

While the engine is operated, under a light load in which the set angle of the accelerator pedal 56 is small, the valve 55 is controlled by the regulator 57 so as to be fully opened, whereby the maximum amount of pressurized oil is supplied from the oil pressure source 54 to the left chamber A of the actuator 44 through the valve 55, the inlet 53, the hole 32a, and the holes 42b. Consequently, the piston 46 moves to the right as shown by the upper half above the fixed shaft 32 in FIG. 2. Further, the cylindrical member 50 is pressed to the right and presses the movable flange 38 of the drive pulley 34 to the right, while contracting the disk spring 41 into a substantially vertical position. Accordingly, the V-shaped groove 89 of the drive pulley 34 is widened to provide a small pitch radius while the V-shaped groove 29 of the driven pulley 22 is narrowed to provide a large pitch radius. Thus, the driven pulley 22 is driven in a speed-reducing mode or in a low rotational frequency mode. In this state, while the rotational frequency of the drive pulley 84 increases, the rotational frequency of the driven pulley 22 substantially increases proportionally along an oblique line "a" in FIG. 3 and reaches a point "X".

Under a light load, since the driven pulley 22 provides a low rotational frequency, the supercharger 1 is operated at a low rotational frequency and therefore requires a only small driving torque. Thus, fuel efficiency is improved.

Under a heavy load corresponding to a large set angle of the accelerator pedal 56, the regulator 57 causes the valve 55 to completely close. No hydraulic pressure is supplied to the actuator 44. Accordingly, since no pressure to the right is applied to the piston 46, the movable flange 38 of the drive pulley 34 moves to narrow the V-shaped groove 39 in response to the return force of the disk spring 41, as shown in the lower half of the drive pulley 34 in FIG. 2.

Then, the V-shaped groove 29 of the driven pulley 22 is widened as shown in the upper half of the driven pulley 22 in FIG. 2. As a result, the driven pulley 22 is controlled in a speed-increasing mode or in a high rotational frequency mode, as depicted by a curve "b" in FIG. 3 at zero hydraulic pressure.

Thus, the supercharger 1 sufficiently supercharges the internal combustion engine as a result of the high rotational frequency of the driven pulley 22, the input shaft 10, the speed-increasing gear device 3, the sun gear 13, the runner shaft 5, and the runner 4 to increase the output level of the engine.

In this embodiment, transition from the light load to the heavy load and vice versa requires only a difference H between the line "a" and the curve "b" in FIG. 3 and is continuously executed. Accordingly, any shock due to speed variation is suppressed, thereby improving driving conditions.

On the other hand, since a conventional supercharger with an electromagnetic clutch requires a difference $H_o$ between zero to the curve "b" in FIG. 3, considerable shock is produced that adversely affects driving conditions.

As described above, normal operation, including the light load and the heavy load conditions, is indicated by an area between the line "a" and the curve "b" in FIG. 3.

In the above-described first embodiment, the cylinder 44a is installed in a dead space, namely inside the input pulley 42 which is driven by the crankshaft of the internal combustion engine through the flat belt 60, and the piston 46 is arranged inside the cylinder 44a, thereby constructing the actuator 44. Accordingly, the dead space inside the input pulley 42 is effectively used, thus elimination the need for any surplus spaces.

Usually, when the engine is changed, the input pulley 42 is also changed. At that time, it is possible to change the input pulley 42 together with the piston 46 as a set so as to construct a control device according to an engine which is to be changed.

Moreover, since the input pulley 42 can be used regardless of whether or not a cylinder is installed, the option type of supercharging device which includes the control device with the piston is interchangeable with a standard type of supercharging device which does not include an actuator, by removing the actuator inside the input pulley or by employing an input pulley which does not have an actuator. In this regard, the above-described interchange of an input pulley which does not have an actuator is easy since the input pulley is coupled with the drive pulley by the bolt 43 so as to be disconnectable from the drive pulley. Consequently, the optional arrangement can be carried our very easily, thereby allowing a variety of supercharging devices to be realized.

An embodiment employing an input pulley which does not have an actuator (i.e., a standard-type input pulley) will be explained below with reference to FIG. 4. Since this embodiment can be employed in a supercharging device which includes the same driven pulley as in the above-described option type of supercharging device, FIG. 4 only shows the half part of the continuously variable transmission that includes the drive pulley while omitting the driven pulley. Different portions from the above-described supercharging device will be explained.

The input pulley 42 is secured to the drive pulley 34a by a bolt 143 so as to be disconnectable therefrom. A room 161 is formed inside the input pulley 42 without an actuator. A fixed shaft 132 has no hole inside thereof. The rest of the structure is the same as the abovedescribed first embodiment. Namely, the movable flange 38 can slide on the cylindrical portion 36 provided in the fixed flange 37 along the axis of the fixed shaft 132. The V-shaped groove 39 into which the belt 28 is received is formed between the fixed flange 37 and the movable flange 38. The movable flange 38 is pressed by the disk spring 41. The drive pulley 34 is rotatably supported on the fixed shaft 32 through the ball bearings 35.

In this device, since no actuator is provided for the control device, the rotational frequencies of the driven pulley 22 and the supercharger 1 are maintained substantially constant regardless of the load on the engine, as shown in FIG. 1.

SECOND EMBODIMENT

Figure 5:
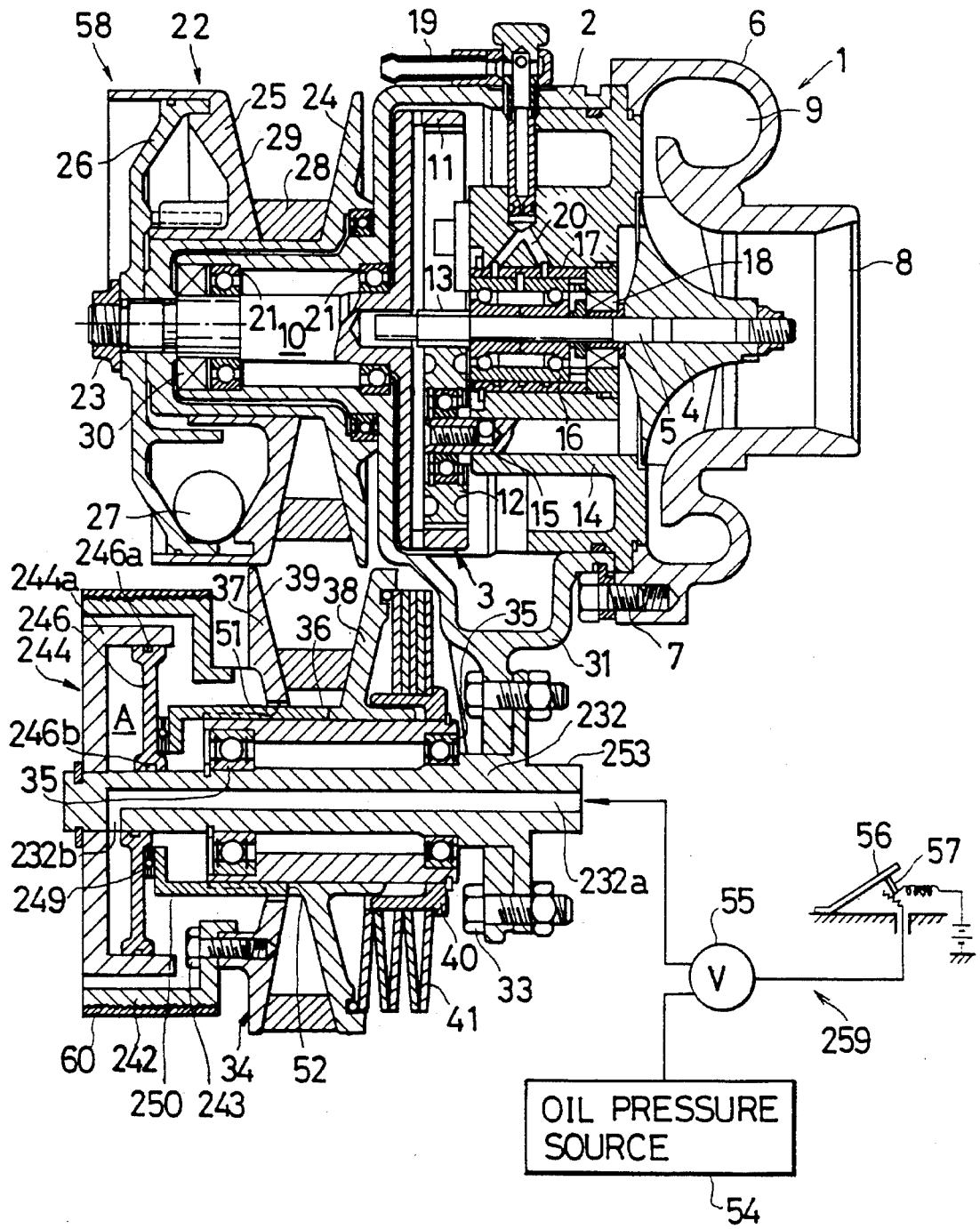
FIG. 5 is a sectional view of a supercharging device according to a second embodiment of the present invention.

Referring now to FIG. 5, a second embodiment will be described. This embodiment includes an oil pressure type of cylinder 244a for an actuator 244 inside an input pulley 242 while employing the same supercharger 1 as in the first embodiment. The cylinder 244a does not rotate together with the input pulley 242, i.e., is an unrotatable cylinder. A structure according to this embodiment comprises the same or similar elements as those of the first embodiment, with the following exceptions.

The inside of the input pulley 242 serves as the actuator 244. Specifically, the oil pressure type of cylinder 244a of the actuator 244 is secured on the left side of a fixed shaft 232 inside the input pulley 242. A space is provided between the input pulley 242 and the cylinder 244a. A piston 246 is arranged inside the cylinder 244a while having seals 246b, 246a respectively abutting the outer circumference of a fixed shaft 232 and the inner circumference of the cylinder 244a so as to be slidable back and forth. The cylinder 244a and piston 246 are separated from the input pulley 242 and do not rotate together with the input pulley 242. The right side of the piston 246 abuts a cylindrical member 250 through a thrust bearing 249. The cylindrical member 250 extends from the piston 246 to the right while penetrating the aperture 51 of the circular boss of the fixed flange 37. The right side of the cylindrical member 250 abuts the abutting face 52 of the movable flange 38. The left chamber A which is formed on the left side of the piston 246 inside the cylinder 244a of the actuator 244 has an inlet 253 which is provided on the right side of the fixed shaft 232. A hole 232a is provided in the fixed shaft 232 along the axis thereof. Further, a hole 232b is provided in the fixed shaft 232 in the radial direction thereof so as to communicate with the hole 232a. The pressurized oil from the oil pressure source 54 is supplied through the valve 55 to the left chamber A through the inlet 253 and the holes 232a and 232b. The valve 55 works similarly to that in the first embodiment.

The actuator 244, the oil pressure source 54, the valve 55, and the regulator 57 serve similarly to those in the first embodiment and form a control device 259 for controlling the continuously variable transmission 58.

In this embodiment, while the engine is operated under the light load, the valve 55 is controlled by the regulator 57 so as to be fully opened, whereby the maximum amount of pressurized oil is supplied from the oil pressure source 54 to the left chamber A of the actuator 244 through the valve 55, the inlet 253, and the holes 232a and 232b. Consequently, the piston 246 moves to the right as shown by the upper half of the fixed shaft 232 in FIG. 5, whereby the cylindrical member 250 is pressed to the right through the thrust bearing 249 and presses the movable flange 38 of the drive pulley 34 to the right, while contracting the disk spring 41 into a substantially vertical position. The resulting effect of the above operation is similar to that of the first embodiment.

In this embodiment, since the cylinder 244a is secured to the fixed shaft 232 of the drive pulley 34 so as not to rotate, centrifugal pressurized oil does not occur in contrast with the supercharging device in the first embodiment. thereby facilitating control therein.

If the actuator is arranged outside of the input pulley, for example, adjacent to the right side of the fixed shaft, a member such as a rod for transmitting the force of the pressurized oil to the movable flange 38 is necessary. For this embodiment, however, there is no need to provide such member since the piston 246 slides back and forth in response to the pressurized oil along the fixed shaft 232 so as to substantially directly move the movable flange 38.

Furthermore, since the cylinder does not rotate, it is not necessary to provide any rotatable seals, which wear away relatively easily. Instead, it is only necessary to provide the seal 246b on the fixed shaft 232 to make the piston 246 slide back and forth.

THIRD EMBODIMENT

Figure 6:
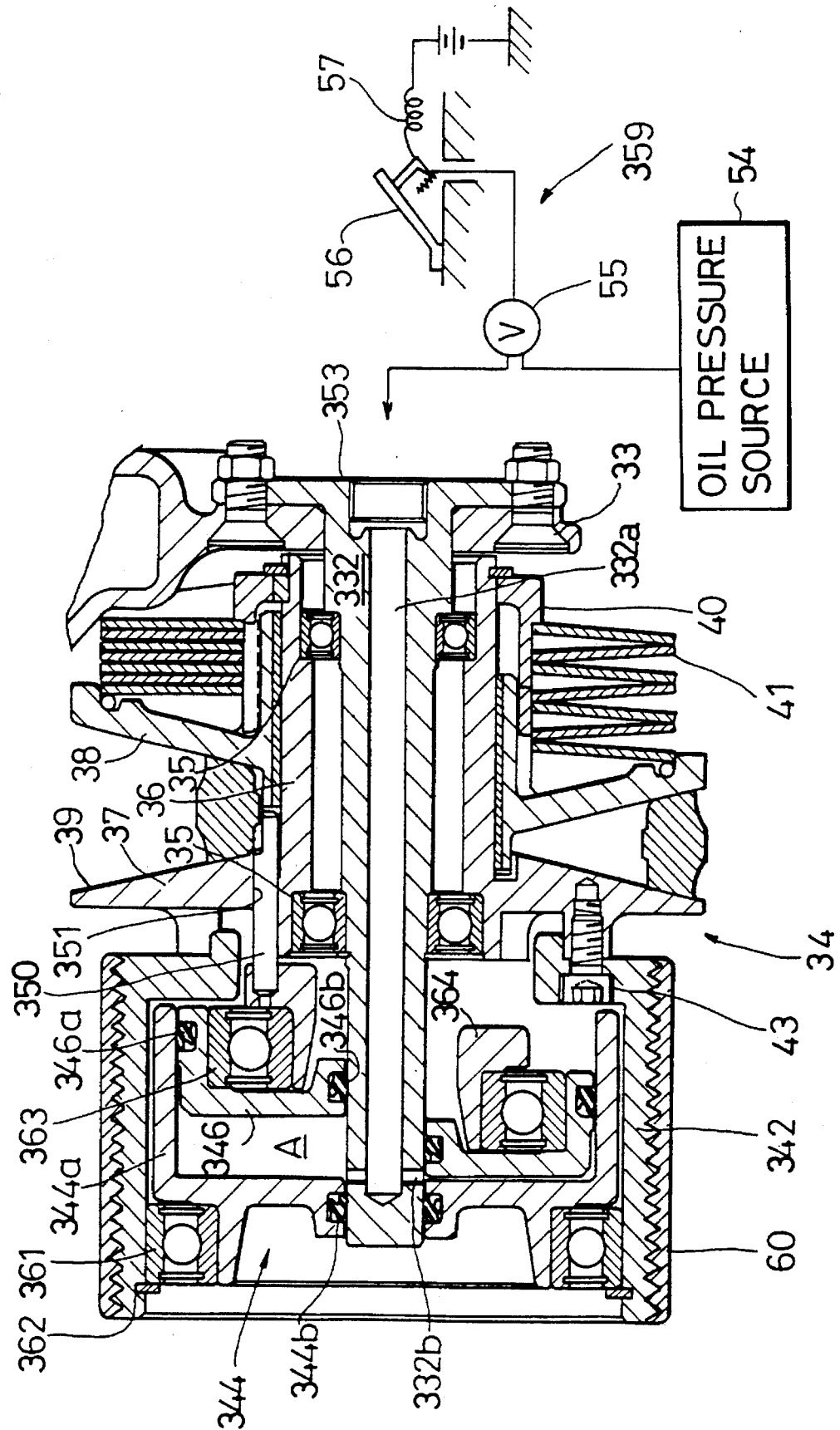
FIG. 6 is a sectional view of a part of a supercharging device according to a third embodiment of the present invention.

Referring now to FIG. 6, a third embodiment will be described. FIG. 6 illustrates a sectional view of a part of a supercharging device which includes the drive pulley 34 of the continuously variable transmission, a control device 359 including an actuator 344, and an input pulley 342.

In this embodiment, the actuator 344 also does not rotate, namely is an unrotatable type actuator, similar to that of the second embodiment. However, although the pressurized oil is supplied from the oil pressure source 54 to the left chamber A of the actuator 344 through the valve 55, an inlet 353, and holes 332a and 332b, the force exerted by the pressurized oil is not transmitted to the bearings 35 provided between a fixed shaft 332 and the cylindrical portion 36 by the following reason.

A piston 346 with oil seals 346a and 346b moves the movable flange 38 to the right through a bearing 363, presser members 364 and 350 in response to the pressurized oil supplied to the left chamber A, whereby the V-shaped groove 39 of the drive pulley 34 is widened. At this time, the force for contracting the disk spring 41 acts on the cylindrical portion 36 through the end plate 40 along the axis of the fixed shaft 332 to the right. Meanwhile, a cylinder 344a with an oil seal 344b is pressed to the left by the pressurized oil, whereby the force exerted by the pressurized oil to the cylinder 344a acts on the cylindrical portion 36 of the fixed flange 39 through a bearing 361 (which is supported by a snap ring 362 on the input pulley 342 so as to be restricted to movement along the axis of the fixed shaft 332) and the input pulley 342 along the axis of the fixed shaft 332 to the left. Consequently, both forces oppositely acting on the cylindrical portion 36 cancel each other out, thereby preventing any force exerted by the pressurized oil from acting on the bearings 35. Thus, the durability of the bearings 35 can be improved.

This embodiment also accomplishes the same operation and effects as the second embodiment.

As many apparently widely different embodiments of this invention may be made without departing from the spirit and scope thereof, it is to be understood that the invention is not limited to the specific embodiments thereof except as defined in the appended claims.

For example, the above-described embodiments are presented with the superchargers being employed as auxiliary machinery. However, the present invention can be applied to other auxiliary machinery such as compressors for air conditioners or power steering.

What is claimed is:

1. A continuously variable transmission comprises:

a drive pulley and a driven pulley, a belt for operatively coupling said drive pulley with said driven pulley, said drive pulley and said driven pulley each having an stationary flange and a movable flange, said movable flanges being axially movable relative to the stationary flanges, said stationary and movable flanges forming a radially tapered annular slot which guides the belt, said drive pulley being rotatably mounted on a stationary shaft, said stationary shaft having an opening extending lengthwise through the stationary shaft;

loading means, abutting said movable flanges, for urging the movable flanges towards the stationary flanges on said drive and driven pulleys in an axial direction relative to said stationary flanges, said loading means being formed as a fly weight and a spring element, said fly weight being provided in the driven pulley, said spring element being provided in the drive pulley;

a control device controlling the axial distance between the stationary and movable flanges of the drive pulley, said control device including an actuator, said actuator including a cylinder and a piston forming a chamber hermetically sealed with respect to the exterior which can be pressurized by a fluid pressure, said piston being connected with the movable flange, said chamber being enabled to be pressurized through the opening of the stationary shaft, said actuator under low load condition pushing away the movable flange from the stationary flange against the restoring force of the spring element; and an input pulley driven by an internal combustion engine and attached to the drive pulley for transmitting engine force of the internal combustion engine to the drive pulley, said actuator being detachably disposed inside said input pulley;

wherein the cylinder is supported by the stationary shaft and there is provided a circumferential gap between an inner wall of the input pulley and an outer wall of the cylinder, and wherein the cylinder is pivotally mounted on, and axially supported against, the input pulley.

2. A continuously variable transmission according to claim 1, further comprises a hollow shaft portion rotatably mounted on the stationary shaft by means of a bearing, wherein the movable flange is supported against a hollow shaft portion in opposite direction to the support of the cylinder, and wherein the input pulley is secured to the hollow shaft portion such that force from the fluid pressure is prevented from being received by the bearing when the chamber is pressurized.

3. A continuously variable transmission according to claim 1, wherein the driven pulley is drivingly connected with a supercharger for the internal combustion engine, said supercharger including a stationary casing and a runner shaft with a runner which is rotatably mounted in the stationary casing, and wherein a speed increasing gearing unit is arranged between the supercharger and the driven pulley.

4. A continuously variable transmission according to claim 3 wherein the opening is a through-opening having a port on the side opposite to the chamber at which side the stationary shaft is secured to the stationary casing.

* * * * *